United States Patent
Malaya et al.

(10) Patent No.: US 11,557,026 B2
(45) Date of Patent: Jan. 17, 2023

(54) AUTOMATED ARTIFACT DETECTION

(71) Applicants: Advanced Micro Devices, Inc., Santa Clara, CA (US); ATI Technologies ULC, Markham (CA)

(72) Inventors: Nicholas Malaya, Austin, TX (US); Max Kiehn, Markham (CA); Stanislav Ivashkevich, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/030,254

(22) Filed: Sep. 23, 2020

(65) Prior Publication Data

US 2021/0383528 A1 Dec. 9, 2021

Related U.S. Application Data

(60) Provisional application No. 63/035,345, filed on Jun. 5, 2020.

(51) Int. Cl.
| | | |
|---|---|---|
| *G06K 9/00* | (2022.01) | |
| *G06T 7/00* | (2017.01) | |
| *G06V 10/46* | (2022.01) | |
| *G06V 20/40* | (2022.01) | |

(52) U.S. Cl.
CPC .......... *G06T 7/0002* (2013.01); *G06V 10/462* (2022.01); *G06V 20/40* (2022.01); *G06T 2207/10016* (2013.01); *G06T 2207/20084* (2013.01); *G06V 20/44* (2022.01)

(58) Field of Classification Search
CPC ......... G06T 7/0002; G06T 2207/10016; G06T 2207/20084; G06K 9/00711; G06K 9/4671; G06K 2009/00738
USPC .......................................................... 382/158
See application file for complete search history.

(56) References Cited

U.S. PATENT DOCUMENTS

| | | | |
|---|---|---|---|
| 10,984,529 B2 * | 4/2021 | Carter | G16H 30/40 |
| 11,069,086 B2 * | 7/2021 | Yokota | B25J 9/163 |
| 2017/0161643 A1 | 6/2017 | Hoover et al. | |
| 2019/0073566 A1 | 3/2019 | Brauer | |
| 2019/0128989 A1 | 5/2019 | Braun et al. | |
| 2019/0259134 A1 | 8/2019 | Rainy | |
| 2020/0074622 A1 | 3/2020 | Yang et al. | |
| 2021/0366183 A1 * | 11/2021 | Gisslén | G06F 11/3664 |

OTHER PUBLICATIONS

Bai, Yubing, et al. "An ensemble learning based adaptive algorithm for capsule endoscope image deblocking." 2017 IEEE 60th International Midwest Symposium on Circuits and Systems (MWSCAS). IEEE, 2017. (Year: 2017).*

(Continued)

*Primary Examiner* — Jonathan S Lee
(74) *Attorney, Agent, or Firm* — Volpe Koenig

(57) ABSTRACT

A technique for detecting a glitch in an image is provided. The technique includes providing an image to a plurality of individual classifiers to generate a plurality of individual classifier outputs and providing the plurality of individual classifier outputs to an ensemble classifier to generate a glitch classification.

23 Claims, 6 Drawing Sheets

(56) References Cited

OTHER PUBLICATIONS

Sun, Zhongbin, Qinbao Song, and Xiaoyan Zhu. "Using coding-based ensemble learning to improve software defect prediction." IEEE Transactions on Systems, Man, and Cybernetics, Part C (Applications and Reviews) 42.6 (2012): 1806-1817. (Year: 2012).*
Saqlain, Muhammad, Bilguun Jargalsaikhan, and Jong Yun Lee. "A voting ensemble classifier for wafer map defect patterns identification in semiconductor manufacturing." IEEE Transactions on Semiconductor Manufacturing 32.2 (2019): 171-182. (Year: 2019).*
Bahaadini, Sara, et al. "Machine learning for Gravity Spy: Glitch classification and dataset." Information Sciences 444 (2018): 172-186. (Year: 2018).*
Davarmanesh, Parmida, et al. "Automating artifact detection in video games." arXiv preprint arXiv:2011.15103 (2020). (Year: 2020).*
Nagy, Robert, and Hussaian Aram Timofeitchik. Verification of Real-Time Graphics Systems. MS thesis. 2012. (Year: 2012).*
Smith, Ryan. FCAT: The Evolution of Frame Interval Benchmarking, Part 1, 2013, AnandTech, https://web.archive.org/web/20130329201851/http://www.anandtech.com/show/6862/fcat-the-evolution-of-frame-interval-benchmarking-part-1 (Year: 2013).*
Dithermaster, How to detect screen tearing programmatically?, 2014, stack overflow, https://stackoverflow.com/questions/24707405/how-to-detect-screen-tearing-programmatically (Year: 2014).*

* cited by examiner

AUTOMATED ARTIFACT DETECTION

CROSS-REFERENCE TO RELATED APPLICATIONS

This application claims the benefit of U.S. Provisional application No. 63/035,345, entitled "AUTOMATED ARTIFACT DETECTION," filed on Jun. 5, 2020, the entirety of which is hereby incorporated herein by reference.

BACKGROUND

Video, such as the sequence of frames generated by a video game, sometimes include glitches. No known automated system is capable of detecting whether such video includes glitches.

BRIEF DESCRIPTION OF THE DRAWINGS

A more detailed understanding can be had from the following description, given by way of example in conjunction with the accompanying drawings wherein.

DETAILED DESCRIPTION

A technique for detecting a glitch in an image is provided. The technique includes providing an image to a plurality of individual classifiers to generate a plurality of individual classifier outputs and providing the plurality of individual classifier outputs to an ensemble classifier to generate a glitch classification.

Figure 1A:
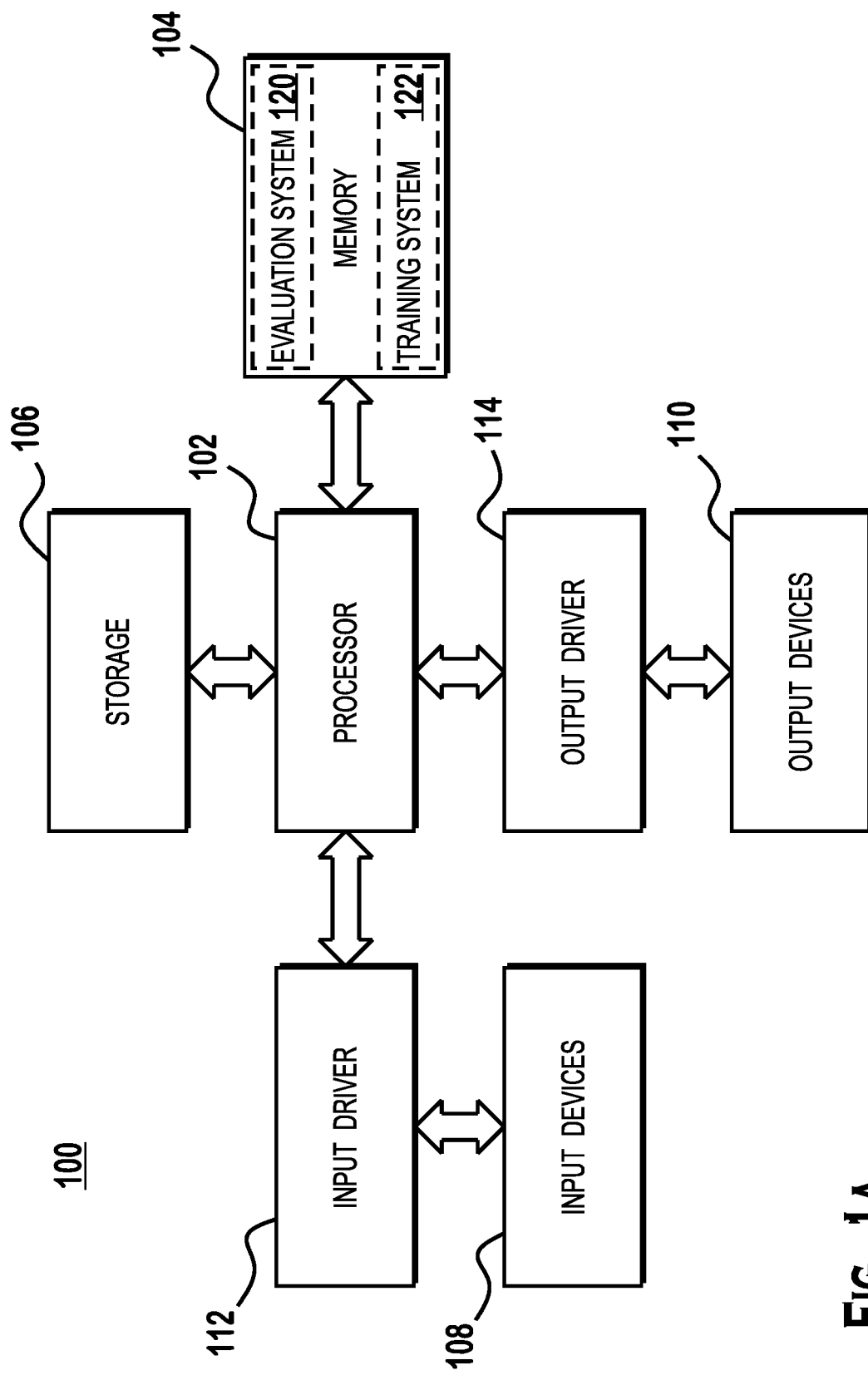
FIG. 1A is a block diagram of an example computing device in which one or more features of the disclosure can be implemented.

FIG. 1A is a block diagram of an example computing device 100 in which one or more features of the disclosure can be implemented. The computing device 100 could be one of, but is not limited to, for example, a computer, a gaming device, a handheld device, a set-top box, a television, a mobile phone, a tablet computer, or other computing device. The device 100 includes one or more processors 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1A.

In various alternatives, the one or more processors 102 include a central processing unit (CPU), a graphics processing unit (GPU), a CPU and GPU located on the same die, or one or more processor cores, wherein each processor core can be a CPU or a GPU. In various alternatives, the memory 104 is located on the same die as one or more of the one or more processors 102, or is located separately from the one or more processors 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that interface with and drive input devices 108 and output devices 110, respectively. The input driver 112 communicates with the one or more processors 102 and the input devices 108, and permits the one or more processors 102 to receive input from the input devices 108. The output driver 114 communicates with the one or more processors 102 and the output devices 110, and permits the one or more processors 102 to send output to the output devices 110.

In various implementations, the device 100 includes one or both of an evaluation system 120 and a training system 122. The evaluation system 120 is capable of detecting graphical anomalies ("glitches") in images such as those produced by video games. The training system 122 trains one or more machine learning components (sometimes referred to as "classifiers") of a network of the evaluation system 120 to recognize glitches.

Some implementations of the device 100 include a computer system configured to train one or more of the machine learning components. Some such implementations include a computer system such as a server or other computer system associated with a server or server farm, where the computer system generates one or more trained classifiers. In some implementations, the computer system that generates one or more trained classifiers also uses the trained classifiers to evaluate whether input images include or do not include a glitch. Other implementations of the device 100 include a computer system (such as a client) that is configured to store a trained network (generated by a different computer system) and to evaluate input data (e.g., an image) through the trained network to determine whether the input data includes a glitch. Thus the device 100 generically represents the architecture of one or more computer systems that generate the trained network and use the trained network to determine whether one or more images includes a glitch.

Figure 1B:
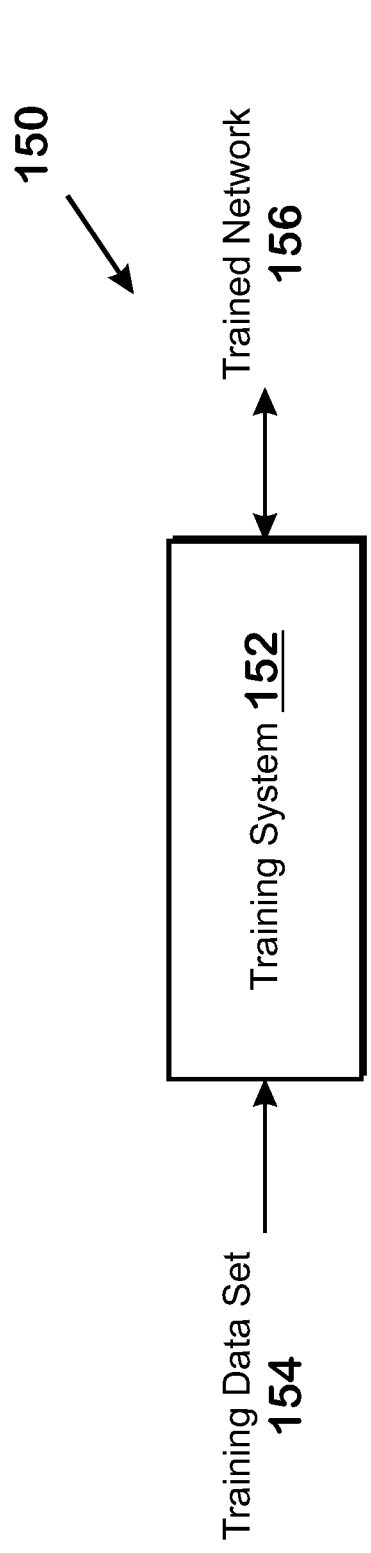
FIG. 1B illustrates a training device according to an example.

FIG. 1B illustrates a training device 150 according to an example. In some implementations, the training device 150 is implemented as the device 100 of FIG. 1A, with the training system 152 being software, hardware, or a combination thereof for performing the operations described herein. The training system 152 accepts a training data set 154 and trains a trained network 156. The training data set 154 includes a plurality of images labeled as either including or not including a glitch. The training system 152 trains the trained network 156 to based on the training data set 154 to recognize whether subsequent input images include or do not include glitches.

Figure 1C:
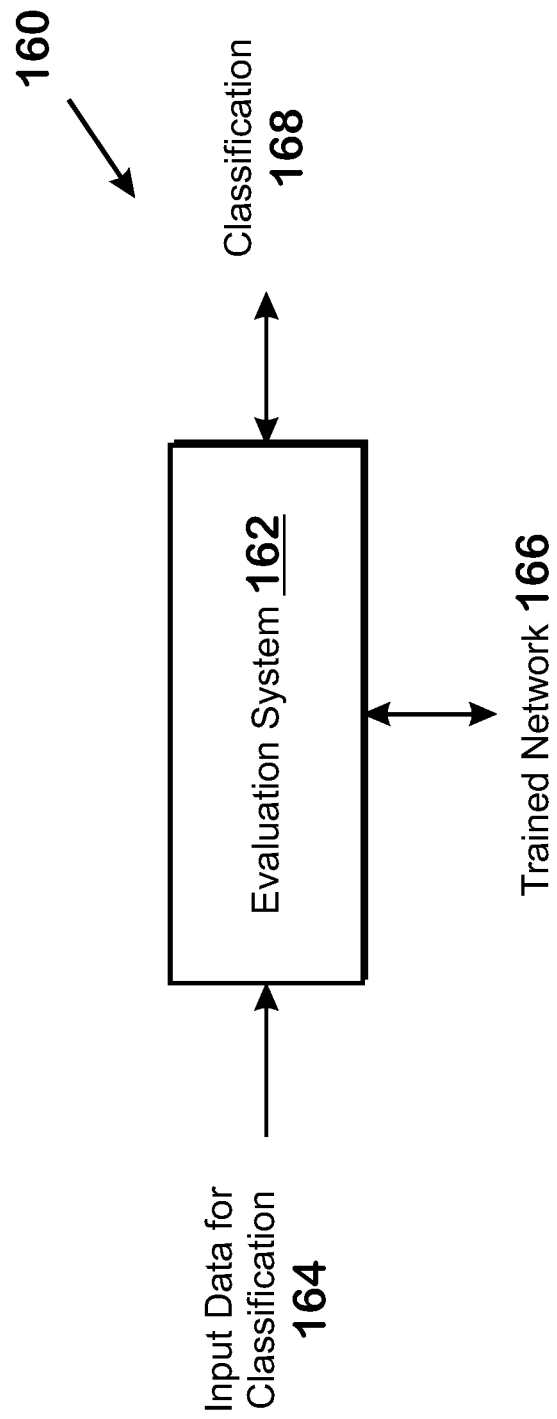
FIG. 1C illustrates an evaluation device that includes an evaluation system for producing a classification for input data based on a trained network, according to an example.

FIG. 1C illustrates an evaluation device 160 that includes an evaluation system 162 for producing a classification 168 for input data 164 based on a trained network 166 (which, in some implementations, is a trained network 156 generated by a training system 152), according to an example. The classification 168 includes an indication of whether the image of the input data 164 includes or does not include a glitch. In some examples, the evaluation system 162 alternatively or additional generates outputs indicating which type or types of glitches exist in the input data 164.

Figure 2:
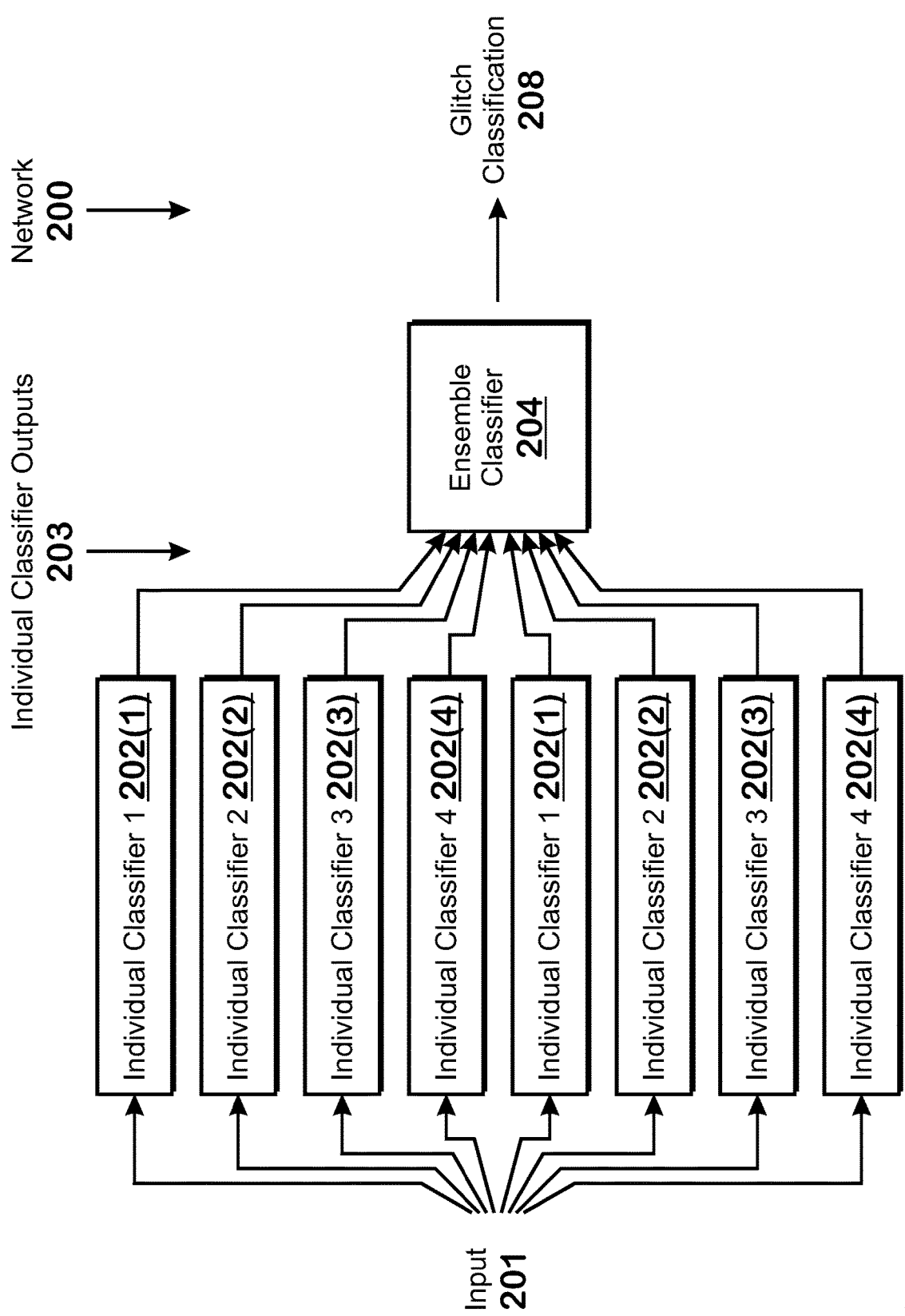
FIG. 2 illustrates a network for classifying an input image as either having or not having a glitch, according to an example.

FIG. 2 illustrates a network 200 for classifying an input image 201 as either having or not having a glitch, according to an example. The network 200 includes a plurality of individual classifiers 202 and an ensemble classifier 204. The individual classifiers 202 include classifiers, such as neural networks, that accept input 201 (which are images) and output individual classifier outputs 203. The individual classifier outputs 203 are indications of whether the input 201 is deemed to include a glitch or whether the input 201 is deemed not to include a glitch. The phrase "deemed to include a glitch" is sometimes replaced with "includes a glitch" herein and means that the classifier labels the input 201 as including a glitch based on the classification mechanism of the individual classifier 202. Similarly, a phrase such as "deemed to not include a glitch" is sometimes replaced with "does not include a glitch" and means that the classifier labels the input 201 as not including a glitch based on the classification mechanism. Each individual classifier 202 outputs one individual classifier output 203. In some implementations, each such individual classifier output 203 is a single indication of whether the input 201 includes a glitch. The ensemble classifier 204 consumes individual classifier outputs 203 to produce a glitch classification 208, which is an indication of whether the input 201 includes a glitch.

The network 200 uses different types of classifiers to determine whether an input image 201 includes a glitch. Each individual classifier 202 is designed with a specific architecture that is tailored to detect one or more specific types of glitches. More specifically, there are many different types of glitches that an input image 201 may include. Some example glitches include shader artifacts, shape artifacts, discoloration artifacts, a morse code pattern, dotted line artifacts, parallel lines, triangulation, line pixelization, screen stuttering, screen tearing, square patch artifacts, blurring artifacts, and random patch artifacts. Each individual classifier 202 is tailored to recognize one or more particular types of glitches.

Shader artifacts include visible artifacts related to improper shading. A "shader program" is a program that executes on a graphics processing unit to perform functions such as transforming vertex coordinates ("vertex shader programs") and coloring pixels ("pixel shader programs"). A shader artifact occurs when one or more polygons are improperly shaded. Instances of such improper shading appear visually in an image as polygonal shapes of different colors that either blend together or display gradual fading in certain directions.

Shape artifacts are artifacts in which random polygonal monocolor shapes appear in an image. Discoloration artifacts are artifacts in which bright spots colored differently than expected exist in the image. A morse code pattern appears when memory cells of a graphics card become stuck and result in those stuck values being displayed rather than the true image being displayed. In various examples, a GPU running at a higher speed than what the GPU was designed for, or at a higher temperature than the GPU was designed for, results in the morse code pattern.

A dotted line artifact typically involves dotted lines having random slopes and positions or radial lines emanating from a single point. Parallel line artifacts include lines that are parallel, have a uniform color, and are not part of the true image. A triangulation artifact appears as a grid of triangles throughout the image, where a smoother, more natural image is actually correct. Line pixelations are characterized as stripes (such as horizontal stripes) having random colors in an image. Screen stuttering occurs when neighboring columns and rows of an image are swapped with each other. Screen tearing occurs as two consecutive frames in a video that are rendered in the same image. Part of the image is the scene at one point in time and another part of the image is the scene at a different point in time.

A square patch artifact is a square patch of uniform or nearly uniform color that anomalously appears in an image. A blurring artifact is a blurring in a portion of an image that should appear in focus. A random patch artifact is a randomly shaped patch of uniform or nearly uniform color that anomalously appears in an image.

As described above, each of the individual classifiers 202 has a specific underlying architecture. In some implementations, this underlying architecture includes "feature extraction" operations, which include one or more operations to modify the raw input data to amplify certain qualitative features present therein. The underlying architecture includes classifiers (also sometimes referred to as "classifier operations" herein) that are able to be trained and, in some implementations, comprise neural networks having adjustable weights. These classifiers output a classification indicating whether a provided input (for example, as modified by the one or more feature extraction operations) includes a glitch.

Some example feature extraction operations include Discrete Fourier Transform, resize (i.e., resolution adjustment), Pixel-Wise Anomaly Measure, Histogram of Oriented Gradients, and Randomized Principal Component Analysis.

The Discrete Fourier Transform converts the two dimensional input image into a two dimensional measure of feature frequency. In one example, the Discrete Fourier Transform is obtained as follows:

$$f(u, v) = \sum_{x=0}^{M-1} \sum_{y=0}^{N-1} f(x, y) e^{-2\pi i \frac{ux}{M}} e^{-2\pi i \frac{vy}{N}}$$

In the above formula, a frequency amplitude for spectral coordinates u and v is obtained through a double summation from 0 to N and 0 to W, where N and M are the size of the input image in pixels. The summation occurs with f(x,y), which is the pixel value at coordinate x, y, multiplied by $$e^{-2\pi i \frac{ux}{M}}$$

and by $$e^{-2\pi i \frac{vy}{N}}.$$

The Discrete Fourier Transform is effective for certain types of glitches that have a prominent regular-frequency component, such as shape glitches, shader glitches, pixelation glitches, triangulation glitches, stuttering glitches, dotted line glitches, and morse code glitches.

The resize operation adjusts the size of the image by scaling the image in terms of resolution. The pixel-wise anomaly measure involves the following. First, an approximation of the global distribution of red, green, and blue intensities is obtained. Then, each pixel gets an anomaly score based on how much the intensity of that pixel deviates from the global distribution. In one example, this anomaly measure is obtained in the following manner. First, a weighted graph G=(V, E) is generated including a set of vertices V={r, g, b} corresponding to the three color intensities and a set of edges E, specified by (a, b, $w_{ab}$), where a and b are elements of V. $w_{ab}$ is the edge weight between vertices a and b. The edge weights are defined as:

$$w_{rg} = \frac{1}{1+\left(\frac{\mu_r - \mu_g}{\alpha}\right)^2}, w_{rb} = \frac{1}{1+\left(\frac{\mu_r - \mu_b}{\alpha}\right)^2},$$

$$w_{gb} = \frac{1}{1+\left(\frac{\mu_g - \mu_b}{\alpha}\right)^2} \text{ where } \alpha = \frac{\mu_r + \mu_g + \mu_b}{3}$$

and where $\mu_r$, $\mu_g$, and $\mu_b$ are the average red, green, and blue intensities in the image, respectively. From the adjacency matrix W, the combinatorial graph Laplacian Matrix L=D−W is computed, where D is the degree matrix defined by:

$$D(a, b) = \begin{cases} \sum_{k=1}^{n} w_{ak}, & \text{if } a = b \\ 0, & \text{otherwise} \end{cases}$$

Subsequently, the normalized Laplacian matrix L* is generated as L*=$D^{-1/2}LD^{-1/2}$ and define an anomaly measure for each pixel x in the image as:

$$\delta(x)=s^T L^* s$$

where s∈$\mathbb{R}^3$ is the color intensity of x.

The histogram of oriented gradients operation is feature for detecting edges in images. In this operation, an M×N color image is represented using three functions R, G, B: $\mathbb{R}^{M \times N}$ R, G, B:$\mathbb{R}^{M \times N}$→R that map each coordinate to the corresponding red, green, and blue color intensity value, respectively. The gradient of these functions at each coordinate is approximated by applying discrete derivative masks at each coordinate. The image is divided into small patches, and the magnitude and orientation of gradients within each patch are computed and summarized by a histogram of gradients containing n bins corresponding to different angles such as 0, $$\frac{\pi}{n}, \frac{2\pi}{n}, \ldots, \frac{(n-1)\pi}{n}.$$

For each gradient with magnitude m and orientation θ, two consecutive bins are selected (where the last and first bins are considered consecutive in addition to bins having consecutive bin numbers) such that θ lies in the range determined by the two bins. With the two bins having angles labeled $\theta_1$ and $\theta_2$, the values of the two bins are $$\frac{mn|\theta - \theta_1|}{\pi} \text{ and } \frac{mn|\theta - \theta_2|}{\pi},$$

respectively. The histograms are then normalized and concatenated to form a feature descriptor of the entire image.

Regarding the Randomized Principal Component Analysis feature, this feature attempts to find directions or principal components that maximize the variance of projected data. Data projected onto a space determined by the first several principal components are used as a low dimensional representation of the original data matrix. Principal components are often computed via singular value decomposition ("SVD") since the principal components are the normalized right singular vectors of the data matrix. However, computing the exact value of the SVD takes O(mn min(m,n)) time, where (m,n) is the dimension of the data matrix. Therefore, it is computationally infeasible to find the exact. Thus in some implementations, the Randomized Principal Component Analysis feature involves applying a randomized power iteration SVD algorithm. Since the most expensive operations in the randomized algorithm are matrix multiplication, the algorithm is easily parallelized. Furthermore, the expected approximation error of the randomized algorithm converges exponentially to the optimal value as the number of iterations increases. Therefore, finding acceptably accurate approximations of principal components occurs in a reasonable amount of time.

As described above, each individual classifier 202 includes one or more classifier operations. Such classifier operations include one or more of convolutional neural networks, logistic regression, random forest, support vector classifier, and linear discriminant analysis.

As described above, each of the individual classifiers 202 is configured to be sensitive to one or more particular types of glitches. To this end, each individual classifier 202 includes one or more particular types of classification operation and, optionally, one or more feature extraction operations. A discussion regarding which feature extraction operations are useful for which glitch types is now provided and is followed by a discussion regarding which classification operations are useful for which glitch types.

The Fourier Transform technique is effective for images including glitches having regular patterns, such as morse code glitches, pixelation glitches, and stuttering glitches. Thus, in some implementations, the individual classifiers 202 for detecting these types of glitches include a feature extraction operation that implements a Fourier Transform technique.

The Histogram of Oriented Gradients technique is useful for detecting edges in an image. Glitches that improperly include edges include screen tearing, shape glitches, shader glitches, square patch glitches, and random patch glitches. The Principal Component Analysis operation is useful for screen tearing glitches, shapes glitches, shader glitches, square patch glitches, and random patch glitches. A statistics retrieval operation retrieves one or more of various statistics from an image.

A convolutional neural network is a neural network that is capable of recognizing image features at different levels of image detail. Thus the convolutional neural network is useful for identifying parallel line glitches, shape glitches, shader glitches, blurring glitches, discoloration glitches, pixelation glitches, triangulation glitches stuttering glitches, dotted line glitches, and morse code glitches.

Support vector classifiers and logistic regression analysis are useful for all described types of glitches, but in some implementations, are not useful for triangulation or discoloration glitches. Random forest classifiers are useful for screen tearing glitches, shape glitches, shader glitches, square patch glitches, random patch glitches, pixelation glitches, stuttering glitches, dotted line glitches, and morse code glitches. k-Neural Network classifiers and Linear Discriminant analysis classifiers are useful for shape glitches, shader glitches, pixelation glitches, stuttering glitches, dotted line glitches, and morse code glitches.

In some implementations, the network 200 includes one or more of the following individual classifiers 202: a parallel line glitch classifier that includes a resize operation followed by a convolutional neural network; a parallel line classifier that includes a statistics retrieval operation followed by either or both of a support vector classifier or a logistic regression algorithm; a screen tearing glitch detector that includes either or both of a principle component analysis operation and a histogram of oriented gradients operation followed by one or more of a support vector classification classifier, a random forest classifier, and a linear regression classifier; a shape glitch detector including resize operation followed by a convolutional neural network, a shape glitch detector including a fourier transform followed by a resize operation followed by a convolutional neural network; a shape glitch detector including a fourier transform followed by a resize operation followed by one or more of a support vector classifier, a random forest classifier, a linear regression classifier, a k-neural network classifier, or a linear discriminant analysis detector; a shape glitch detector including a statistics retrieval operation followed by either or both of a support vector classifier or a logistic regression algorithm; a shape glitch detector including one or more of a principal component analysis operation and a histogram of oriented gradients operation followed by one or more of a support vector classifier, a random forest classifier, and a linear regression classifier; a square patch glitch detector including one or more of a principal component analysis operation and a histogram of oriented gradients operation followed by one or more of a support vector classifier, a random forest classifier, and a linear regression classifier; a blur glitch detector including a resize operation followed by a convolutional neural network; a blur glitch detector including a statistics retrieval operation followed by either or both of a support vector classifier or a logistic regression algorithm; a random patch glitch detector including a statistics retrieval operation followed by either or both of a support vector classifier or a logistic regression algorithm; a random patch glitch detector including one or more of a principal component analysis operation and a histogram of oriented gradients operation followed by one or more of a support vector classifier, a random forest classifier, and a linear regression classifier; a discoloration glitch classifier including a resize operation followed by a convolutional neural network; a pixelation glitch classifier including a fourier transform followed by a resize operation followed by a convolutional neural network; a pixelation glitch classifier including a fourier transform followed by a resize operation followed by one or more of a support vector classifier, a random forest classifier, a linear regression classifier, a k-neural network classifier, or a linear discriminant analysis detector; a pixelation glitch classifier including a statistics retrieval operation followed by either or both of a support vector classifier or a logistic regression algorithm; a triangulation glitch classifier including a fourier transform followed by a resize operation followed by a convolutional neural network; a stuttering glitch classifier including a fourier transform followed by a resize operation followed by a convolutional neural network; a stuttering glitch classifier including a fourier transform followed by a resize operation followed by one or more of a support vector classifier, a random forest classifier, a linear regression classifier, a k-neural network classifier, or a linear discriminant analysis detector; a stuttering glitch classifier including a statistics retrieval operation followed by either or both of a support vector classifier or a logistic regression algorithm; a dotted line glitch classifier including a fourier transform followed by a resize operation followed by a convolutional neural network; a dotted line glitch classifier including a fourier transform followed by a resize operation followed by one or more of a support vector classifier, a random forest classifier, a linear regression classifier, a k-neural network classifier, or a linear discriminant analysis detector; a dotted line glitch classifier including a statistics retrieval operation followed by either or both of a support vector classifier or a logistic regression algorithm; a morse code glitch detector including a fourier transform followed by a resize operation followed by a convolutional neural network; a morse code glitch detector including a fourier transform followed by a resize operation followed by one or more of a support vector classifier, a random forest classifier, a linear regression classifier, a k-neural network classifier, or a linear discriminant analysis detector; and a morse code glitch detector including a statistics retrieval operation followed by either or both of a support vector classifier or a logistic regression algorithm.

In some implementations, one or more individual classifiers 202 are configured and trained to detect multiple different types of glitches. In the description above, which lists certain types of individual classifiers 202 and the classifier operations and feature extraction operations included, various individual classifiers 202 are described as including the same types of classifiers and feature extraction operations. For example, the above description describes both a shape glitch detector and a shader glitch detector that include a fourier transform operation, a resize operation, and a convolutional neural network classifier. In some implementations, a network 200 includes at least one individual classifier 202 configured to detect several different glitch types. Such "sharing" is possible for glitch types that can be implemented as the same set of classifier operation(s) and feature extraction operation(s) according to the above disclosure. In some examples, a network 200 includes the following five individual classifiers 202: 1) a resize operation followed by a convolutional neural network; 2) a fourier transform followed by a resize operation followed by a convolutional neural network; 3) a fourier transform followed by a resize operation followed by one or more of a support vector classifier, a random forest classifier, a linear regression classifier, a k-neural network classifier, or a linear discriminant analysis detector; 4) a statistics retrieval operation followed by either or both of a support vector classifier or a logistic regression algorithm; and 5) one or more of a principal component analysis operation and a histogram of oriented gradients operation followed by one or more of a support vector classifier, a random forest classifier, and a linear regression classifier. Each such individual classifier 202 is trained and configured to detect one or more glitch types described above. Alternatively, a network 200 includes any number of individual classifiers 202 that perform classification for multiple glitch types, as well as any number that perform classification for a single glitch type. The present disclosure contemplates a network 200 including any combination of individual classifiers 202 configured as described above and assigned to detect the glitch types described above.

As described, each individual classifier 202 produces an output indicating whether that classifier 202 detects a glitch in the input 201. The ensemble classifier 204 combines this output to produce the glitch classification 208 that indicates whether the input image 201 includes a glitch. In various examples, the ensemble classifier 204 is a simple OR function or a logistic regression function that is trained.

Figure 3A:
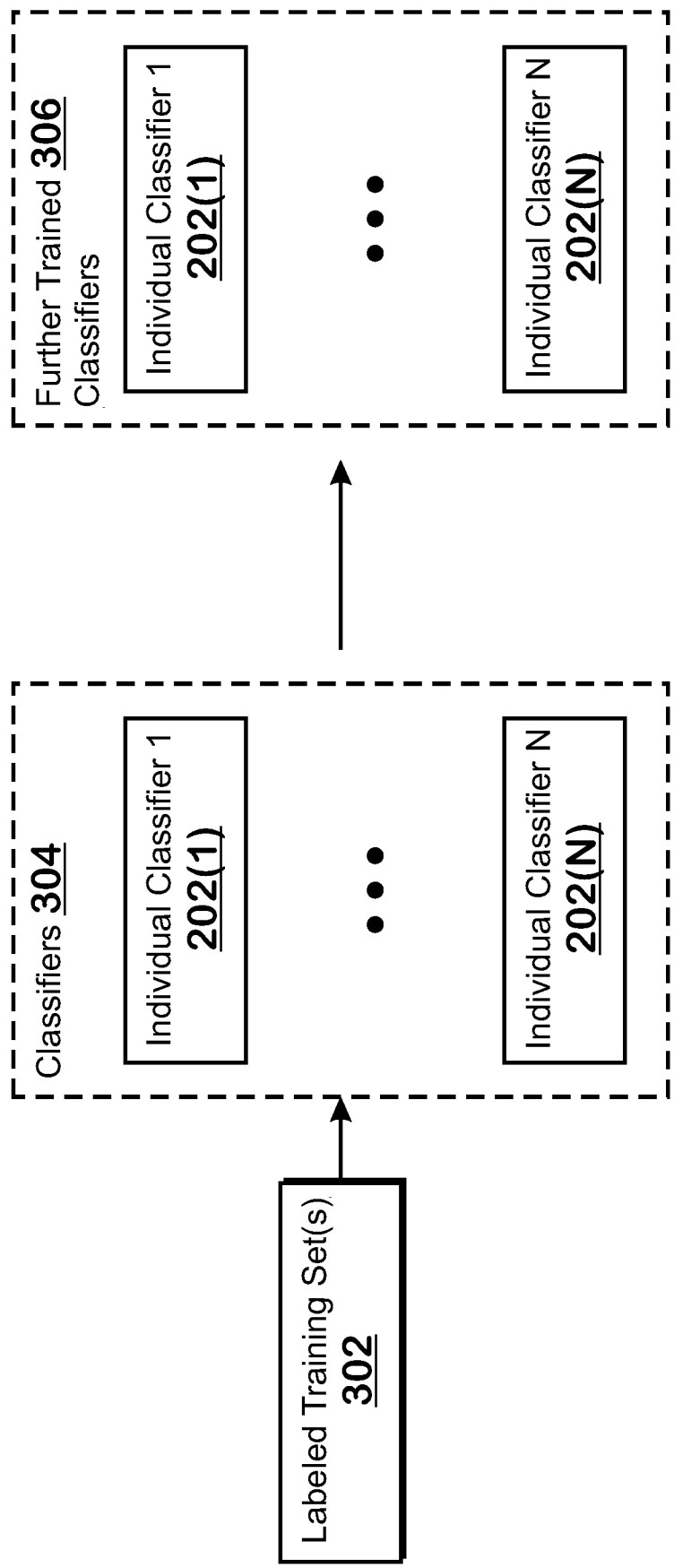
FIG. 3A illustrates an operation for training individual classifiers, according to an example.

FIG. 3A illustrates an operation for training individual classifiers 202, according to an example. A training system 152 accepts labeled training sets 302 and trains the individual classifiers 202 based on the training sets 302. The training sets 302 include images having no defects and images having one or more defects. Further, each image is labeled as including a defect or not including a defect. For each individual classifier 202, the training system 152 provides images from he labeled training sets 302 that either include a defect of the type that the individual classifier 202 is sensitive to or an image that does not include a defect. The training system 152 trains the classifiers 304 based on the labeled training sets 302 to generate further trained classifiers 306. In various implementations, the training system performs any technically feasible means for training the individual classifiers 202, such as through back propagation.

Figure 3B:
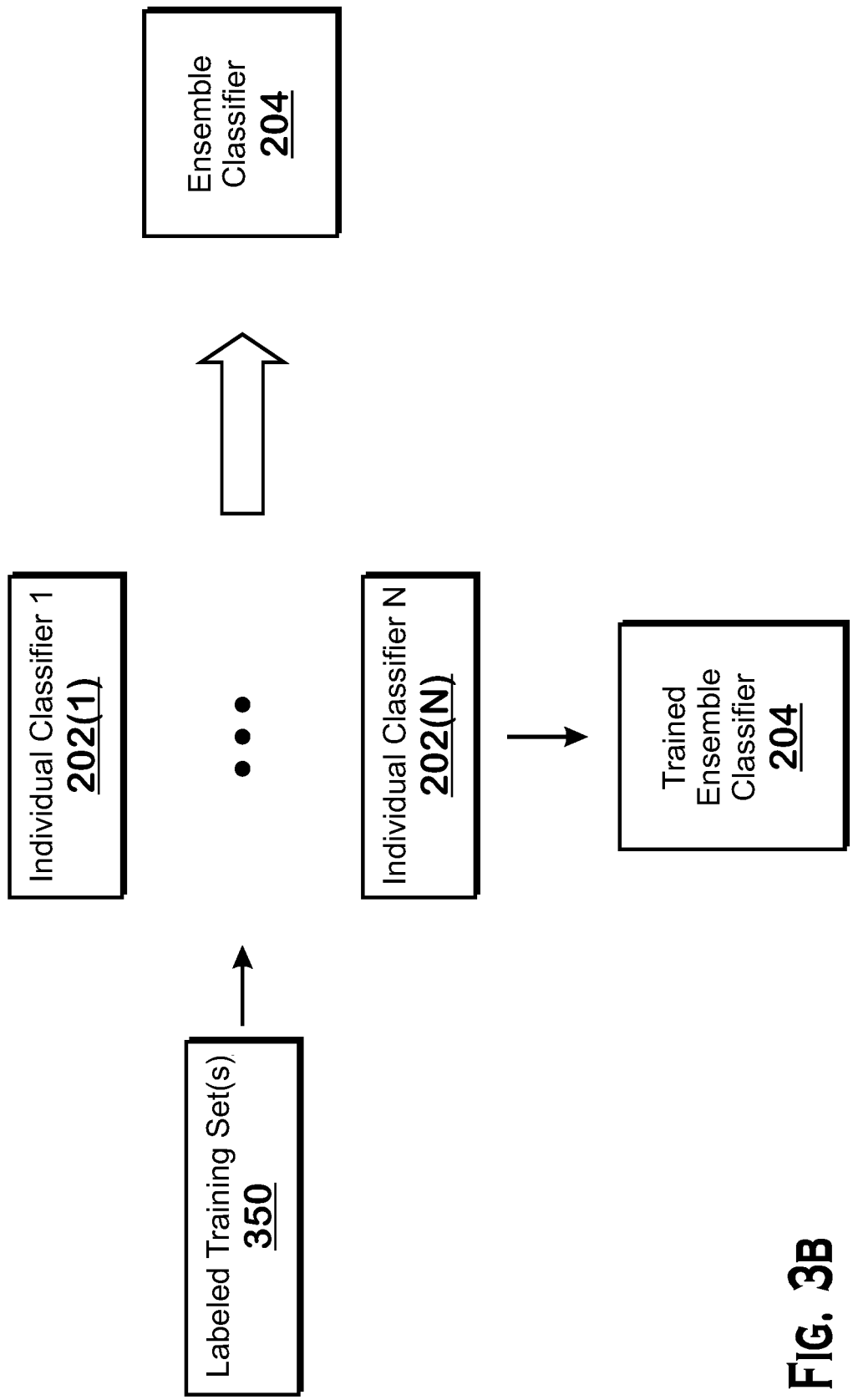
FIG. 3B illustrates an operation for training the ensemble classifier, according to an example.

FIG. 3B illustrates an operation for training the ensemble classifier 204, according to an example. The training system 152 accepts labeled training sets 350. The training system 152 applies the labeled training sets 350 to the individual classifiers 202, which provide outputs to the ensemble classifier 204. The training system 152 trains the ensemble classifier 204 to accurately output a classification of whether the inputs include a glitch or not, based on the outputs from the individual classifiers 202.

Figure 4:
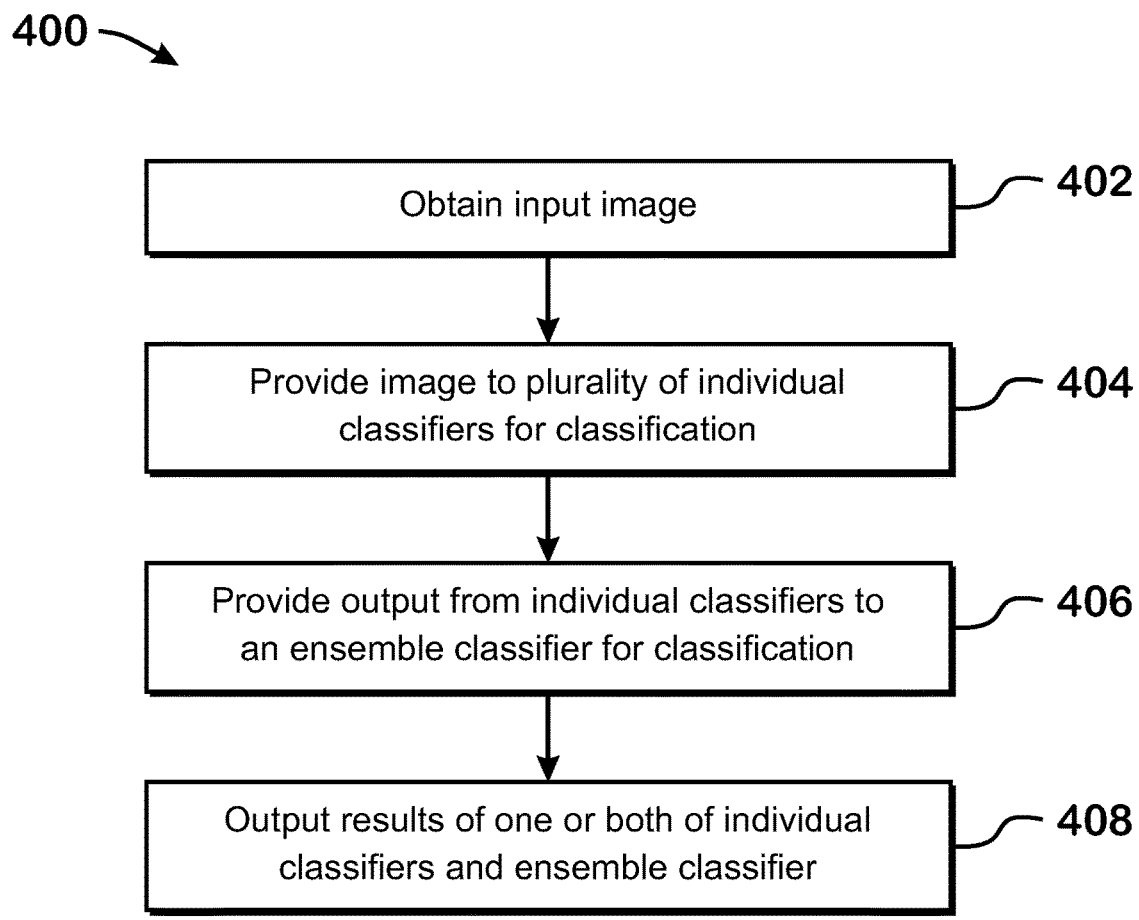
FIG. 4 is a flow diagram of a method for classifying an image as either containing or not containing a glitch.

FIG. 4 is a flow diagram of a method 400 for classifying an image as either containing or not containing a glitch. Although described with respect to the systems of FIGS. 1A-3B, any system configured to perform the steps of the method 400 in any technically feasible order falls within the scope of the present disclosure.

The method 400 begins at step 402, where an evaluation system 162 obtains an input image. The input image is obtained from any technically feasible source, such as output from a video game. Some input images include glitches and some input images do not include glitches. At step 404, the evaluation system 162 provides the input image to a plurality of individual classifiers 202 for classification. The individual classifiers 202 perform their respective operations, including performing one or more feature extraction operations and one or more classification operations. The evaluation system 162 provides the output from the individual classifiers 202 to an ensemble classifier for classification. The ensemble classifier provides an output indicating whether the image includes a glitch. The evaluation system 162 outputs the output of the ensemble classifier for use. In various examples, using the classifier includes storing the ensemble classifier at a system that generates or receives images from, for example, a video game, and applying generated images to the ensemble classifier to generate classifications. In some examples, the system that utilizes the classification of the images makes decisions regarding how to generate or receive the images. In some examples, the system performs one or more corrective actions to eliminate glitches, such as reducing rendering complexity, increasing processor performance, or through some other techniques. In some examples, the system reports the one or more glitches to a different system for recordkeeping and use at a later time, such as for debugging. Any other technically feasible use for the glitch classification is possible.

Any of the various elements of FIGS. 1A-4, such as the training system 152, evaluation system 162, individual classifiers 202, and the ensemble classifier 204, are, in various implementations, implemented as one of software executing on a processor, hardware that is hard-wired (e.g., circuitry) to perform the various operations described herein, or a combination thereof.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for detecting a glitch in an image, the method comprising:
providing an image to a plurality of individual classifiers to generate a plurality of individual classifier outputs; and
providing the plurality of individual classifier outputs to an ensemble classifier to generate a glitch classification, wherein the individual classifiers includes a first classifier and a second classifier, wherein the first classifier is more sensitive to a first glitch type than the second classifier, and the second classifier is more sensitive to a second glitch type than the first classifier, wherein the first glitch type comprises one or more of a triangulation artifact or a square patch artifact.

2. The method of claim 1, wherein the plurality of individual classifiers includes a first individual classifier that includes a classification operation.

3. The method of claim 2, wherein the classification operation includes one of a convolutional neural network classifier, a logistic regression classifier, a random forest classifier, a support vector classifier, and a linear discriminant analysis classifier.

4. The method of claim 1, wherein the plurality of individual classifiers includes a first feature extraction operation.

5. The method of claim 4, wherein the feature extraction operation includes one of a discrete fourier transform operation, a pixel-wise anomaly measure operation, a histogram of oriented gradients operation, a randomized principal component analysis operation, and a statistics retrieval operation.

6. The method of claim 1, wherein the first glitch type further comprises one or more of a shader artifact, a discoloration artifact, a morse code pattern, a dotted line artifact, a parallel line artifact, a line pixelization glitch, a screen stuttering artifact, or a screen tearing artifact.

7. The method of claim 6, wherein the second glitch type includes one of a shader artifact, a shape artifact, a discoloration artifact, a morse code pattern, dotted line artifacts, parallel lines, triangulation, screen stuttering, screen tearing, square patch artifacts, blurring artifacts, and random patch artifacts.

8. The method of claim 1, wherein a first individual classifier includes a combination of one or more feature extraction operations and one or more classification operations, wherein the combination is sensitive to a type of glitch associated with the individual classifier.

9. The method of claim 1, wherein the ensemble classifier comprises a logistic regression classifier.

10. A device for detecting a glitch in an image, the device comprising:
a plurality of individual classifiers of an evaluation system; and
an ensemble classifier,
wherein the plurality of individual classifiers are configured to generate a plurality of individual classifier outputs based on an image;
wherein the ensemble classifier is configured to generate a glitch classification based on the plurality of individual classifier outputs; and
wherein the individual classifiers includes a first classifier and a second classifier, wherein the first classifier is more sensitive to a first glitch type than the second classifier, and the second classifier is more sensitive to a second glitch type than the first classifier, wherein the first glitch type comprises one or more of a triangulation artifact or a square patch artifact.

11. The device of claim 10, wherein the plurality of individual classifiers includes a first individual classifier that includes a classification operation.

12. The device of claim 11, wherein the classification operation includes one of a convolutional neural network classifier, a logistic regression classifier, a random forest classifier, a support vector classifier, and a linear discriminant analysis classifier.

13. The device of claim 10, wherein the plurality of individual classifiers includes a first feature extraction operation.

14. The device of claim 13, wherein the feature extraction operation includes one of a discrete Fourier transform operation, a pixel-wise anomaly measure operation, a histogram of oriented gradients operation, a randomized principal component analysis operation, and a statistics retrieval operation.

15. The device of claim 10, wherein the first glitch type further comprises one or more of a shader artifact, a discoloration artifact, a morse code pattern, a dotted line artifact, a parallel line artifact, a line pixelization glitch, a screen stuttering artifact, or a screen tearing artifact.

16. The device of claim 15, wherein the second glitch type includes one of a shader artifact, a shape artifact, a discoloration artifact, a morse code pattern, dotted line artifacts, parallel lines, triangulation, screen stuttering, screen tearing, square patch artifacts, blurring artifacts, and random patch artifacts.

17. The device of claim 10, wherein a first individual classifier includes a combination of one or more feature extraction operations and one or more classification operations, wherein the combination is sensitive to a type of glitch associated with the individual classifier.

18. The device of claim 10, wherein the ensemble classifier comprises a logistic regression classifier.

19. A non-transitory computer-readable medium storing instructions that, when executed by a processor, cause the processor to detect a glitch in an image, by:
providing an image to a plurality of individual classifiers to generate a plurality of individual classifier outputs; and
providing the plurality of individual classifier outputs to an ensemble classifier to generate a glitch classification.,
wherein the individual classifiers includes a first classifier and a second classifier, wherein the first classifier is more sensitive to a first glitch type than the second classifier, and the second classifier is more sensitive to a second glitch type than the first classifier, wherein the first glitch type comprises one or more of a triangulation artifact or a square patch artifact.

20. The non-transitory computer-readable medium of claim 19, wherein the plurality of individual classifiers includes a first individual classifier that includes a classification operation.

21. The non-transitory computer-readable medium of claim 20, wherein the classification operation includes one of a convolutional neural network classifier, a logistic regression classifier, a random forest classifier, a support vector classifier, and a linear discriminant analysis classifier.

22. The non-transitory computer-readable medium of claim 19, wherein the plurality of individual classifiers includes a first feature extraction operation.

23. The non-transitory computer-readable medium of claim 19, wherein the first glitch type further comprises one or more of a shader artifact, a discoloration artifact, a morse code pattern, a dotted line artifact, a parallel line artifact, a line pixelization glitch, a screen stuttering artifact, or a screen tearing artifact.

* * * * *